United States Patent
Memmel et al.

(10) Patent No.: US 6,722,640 B2
(45) Date of Patent: Apr. 20, 2004

(54) SPRING AND SHOCK ABSORBER UNIT FOR AIR-SUSPENDED VEHICLE

(75) Inventors: Georg Memmel, Schweinfurt (DE); Wolfgang Kolb, Werneck/Ettleben (DE); Roland Berghaus, Lindlar (DE); Burchard Michels, Much (DE); Bernd Rhein, Overath (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/373,507

(22) Filed: Feb. 25, 2003

(65) Prior Publication Data

US 2003/0164585 A1 Sep. 4, 2003

(30) Foreign Application Priority Data

Mar. 1, 2002 (DE) .......................................... 102 09 113

(51) Int. Cl.$^7$ .................................................. F16F 9/08
(52) U.S. Cl. .............................. 267/64.24; 280/124.141
(58) Field of Search .......................... 267/64.19, 64.21, 267/64.23, 64.24, 64.27, 220; 280/124.141

(56) References Cited

U.S. PATENT DOCUMENTS

| | | | | |
|---|---|---|---|---|
| 2,980,441 A | * | 4/1961 | Timpner et al. | ......... 267/64.19 |
| 3,181,853 A | * | 5/1965 | Howell | ....................... 267/256 |
| 4,325,541 A | * | 4/1982 | Korosladanyi et al. | ..... 267/220 |
| 6,286,820 B1 | * | 9/2001 | Raulf et al. | ............... 267/64.21 |

FOREIGN PATENT DOCUMENTS

| | | | | |
|---|---|---|---|---|
| DE | 196 25 106 | | 1/1998 | .......... B60G/13/00 |
| DE | 197 55 549 | | 10/1998 | .......... B60G/15/08 |
| DE | 199 59 839 | | 7/2000 | .......... B60G/15/14 |

* cited by examiner

Primary Examiner—Christopher P. Schwartz
(74) Attorney, Agent, or Firm—Cohen, Pontani, Lieberman & Pavane

(57) ABSTRACT

A U-type bellows air spring is supported on one side relative to the vehicle frame and on the other side relative to the axle or a longitudinal control arm guiding the latter. The lower end of the U-type bellows is fastened on the longitudinal control arm side in a pressure-tight manner to a flange of a supporting element, and a vibration absorber protrudes through the supporting element. A piston cylinder of the vibration absorber is connected to the longitudinal control arm via a joint, and a piston rod on the longitudinal axis of the air spring is supported relative to the vehicle frame. To keep the amount of sealing for the air spring small even if it is not used very much, the supporting element for the lower end of the U-type bellows is arranged rigidly with respect to the piston cylinder of the vibration absorber. A preferably cylindrical circumferential surface for the U-type bellows to roll along during the compression and rebound action extends from the flange toward the longitudinal control arm.

33 Claims, 5 Drawing Sheets

SPRING AND SHOCK ABSORBER UNIT FOR AIR-SUSPENDED VEHICLE

BACKGROUND OF THE INVENTION

1. Field of the Invention

The invention relates to a spring and shock absorber unit for air-suspended vehicle axles having a U-type bellows air spring which is supported on one side relative to the vehicle frame and on the other side relative to the vehicle axle or a longitudinal control arm guiding the vehicle axle. The U-type bellows is fastened on the longitudinal control arm side in a pressure-tight manner to a supporting element, and a vibration absorber arranged on the longitudinal axis of the air spring protrudes through the supporting element. The piston cylinder of the vibration absorber is connected to the longitudinal control arm via a joint and the piston rod is supported relative to the vehicle frame.

2. Description of the Related Art

A spring and shock absorber unit having these features is disclosed in DE 199 59 839 A1. It first of all comprises a U-type bellows air spring which is fastened to the vehicle frame in a manner known per se via a trunk piston, along which the U-type bellows can roll, on a chassis part guiding the vehicle axle, and via an upper closing cover. The particular feature of the spring and shock absorber unit according to DE 199 59 839 A1 is that a vibration absorber is structurally integrated in the air spring, which is of largely conventional construction. In this case, the piston cylinder of the vibration absorber is, for the most part, situated centrally within the trunk piston of the air spring, whereas the piston rod protrudes through the air space of the air spring and is supported with its end relative to the vehicle frame. If the vibration absorber were connected fixedly on one side to the chassis parts and on the other side to the vehicle frame, bending and therefore tilting of the vibration absorber would occur during the compression action. In order to avoid this, the piston rod of the vibration absorber is articulated relative to the vehicle frame and the piston cylinder is articulated relative to those vehicle parts to which it is fastened. For this purpose, the piston cylinder is arranged in a manner such that it can be moved at an angle in the trunk piston by means of a pivot bearing. However, the articulation ability of the piston cylinder realized in this manner must not result in air escaping from the air spring via the joint, which is exposed on its one side to the full air pressure of the air spring. For this reason, the joint has at least one additional sealing ring which seals the air volume in the spring space.

Since the sealing ring has to join in with the pivoting movements of the vibration absorber in the driving mode, it is subject to a high degree of wear, which forces frequent replacement of the sealing ring, which is difficult to gain access to.

SUMMARY OF THE INVENTION

The invention is based on the object of providing a spring and shock absorber unit which is improved with regard to the sealing between the vibration absorber and air spring.

This object is achieved by arranging the supporting element for the lower end of the U-type bellows rigidly with respect to the piston cylinder of the vibration absorber.

In the case of the spring and shock absorber unit according to the invention, not only does the vibration absorber pivot with respect to the longitudinal control arm, but so too does part of the air spring, specifically that supporting element to which the U-type bellows of the air spring is fastened in a pressure-tight manner on the longitudinal control arm side. There is a rigid connection between the vibration absorber, on the one hand, and the supporting element of the air spring, on the other hand, these two parts therefore together following each compression and rebound movement of the vehicle. Owing to the rigid arrangement of the supporting element of the air spring with respect to the piston cylinder of the vibration absorber, the sealing of these two parts with respect to each other only has to meet undemanding requirements. Although sealing is necessary in order to prevent the compressed air from escaping from the air spring, the sealing between two parts which cannot be moved relative to each other is not mechanically stressed and is therefore not critical.

With a preferred refinement of the spring and shock absorber unit, it is proposed that the supporting element has at least one flange which surrounds the vibration absorber and to which the lower end of the U-type bellows is fastened in a pressure-tight manner, and that a preferably cylindrical circumferential surface for the U-type bellows to roll along during the compression and rebound action extends from the flange toward the longitudinal control arm. In this refinement, the flexible U-type bellows can roll in a controlled manner along the preferably cup-shaped trunk piston. In order to obtain a structurally simple design of the trunk piston, the flange and circumferential surface are parts of a cup which is open downward toward the longitudinal control arm.

The joint, via which the vibration absorber is mounted pivotably on the longitudinal control arm, is preferably surrounded by the circumferential surface which has an axial height extending from the flange. The joint is preferably situated at approximately half the axial height of the circumferential surface.

With a further refinement, it is proposed that that part of the joint which is on the air spring side is situated on a rigid sleeve surrounding the piston cylinder, and that both the piston cylinder and the supporting element are fastened to the sleeve. This permits a construction with just a few individual parts, since the sleeve takes on a dual function. Both the vibration absorber and the supporting element of the air spring are fastened to it.

In order to keep any bending moments on the vibration absorber as low as possible, with a further refinement of the invention, the axis of rotation of the joint intersects the longitudinal axis of the vibration absorber at a right angle. The joint may also be, for example, a spherical ball socket as is disclosed in FIG. 6 of DE 199 59 839 A1.

With a further refinement, that part of the joint which is on the longitudinal control arm side is situated on a fork which is part of the longitudinal control arm, and the piston cylinder is arranged pivotably between the two halves of the fork. The fork, first of all, permits a particularly weight-saving manner of construction, this being of importance, since the longitudinal control arm and hence also the fork are included in the unsuspended masses of the chassis. In addition, the fork permits the head wind to pass in an unobstructed manner to the vibration absorber arranged between the two fork halves and thereby permits it to cool the piston cylinder of said vibration absorber.

The fork is preferably composed of an essentially horizontal fork section, which forms an extension of the longitudinal control arm, and of a fork end which is arranged at right angles to said fork section and on which that part of the joint which is on the longitudinal control arm side is situated.

The piston cylinder is preferably provided in the region of its end facing the piston rod with a collar which fixes the piston cylinder relative to compressive and tensile forces in the air spring.

During operation, vibration absorbers tend to generate a considerable amount of heat. In order to better conduct this heat away, it is proposed, with a further refinement, that the piston cylinder is extended at its end facing away from the piston rod to such an extent that the extended section of the piston cylinder protrudes from the air spring.

On account of the considerable spring deflections, it is advantageous if the piston rod is a two-stage telescopic piston rod.

In order to obtain a small overall height of the entire spring and shock absorber unit, the upper end of the U-type bellows is fastened in a pressure-tight manner to a cover which, for its part, can be fastened to the vehicle frame. The cover is provided with a central part which projects in a cup-like manner in the direction of the air spring and on the base of which the end of the piston rod is supported in a pressure-tight manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
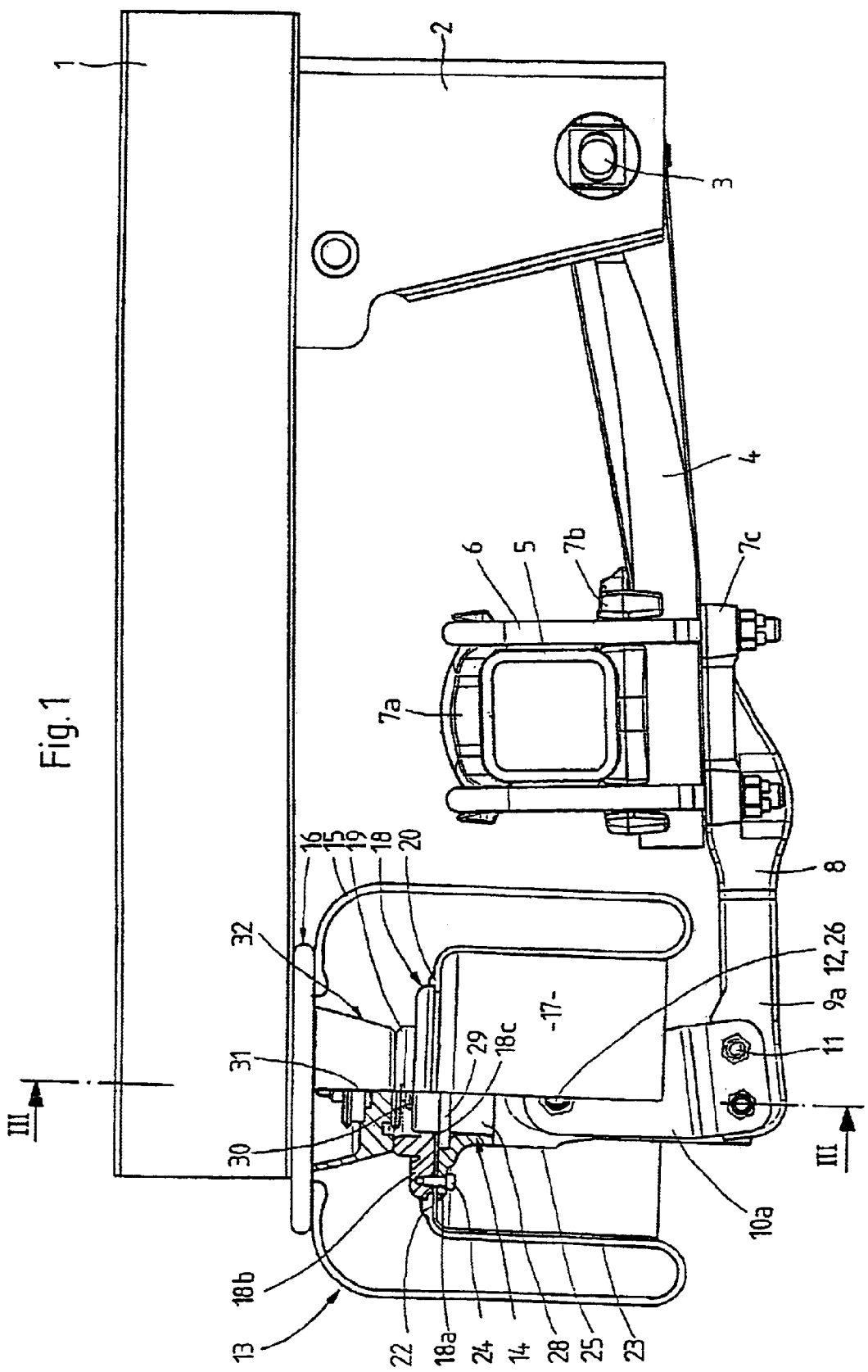
FIG. 1 is a partially cut-away side view of a chassis provided with a spring and shock absorber unit according to the invention, preferably the chassis of a heavy-duty trailer or heavy-duty semitrailer.

In the drawing, the reference number 1 refers to a vehicle frame of a truck trailer or of a semitrailer for a truck. A console 2 fastened below the vehicle frame 1 forms a fixed articulation point 3 for a longitudinal control arm 4 which can be pivoted about the articulation point 3 and extends essentially in the longitudinal direction of the vehicle. A respective console 2 having a longitudinal control arm 4 arranged pivotably on it is provided on each side of the vehicle. The two longitudinal control arms 4 are connected to an axle tube 5 of the vehicle axle, this tube supporting the wheels. This connection takes place in a manner known per se via an axle-fixing means having clamps 6 and axle tabs 7a, 7b and 7c.

In addition, a functional component of each longitudinal control arm 4 is a control-arm extension in the form of a fork 8 extending essentially horizontally in the same manner as the longitudinal control arm. To this end, it can be seen in FIG. 2 that the fork 8 is not yet branched in the region of the axle-fixing means, and it branches only in its rear region into the fork halves 9a, 9b. The fastening of the fork 8 to the longitudinal control arm 4 and the axle tube 5 likewise takes place using the axle-fixing means comprising the clamps 6 and the axle tabs 7a, 7b.

The embodiment illustrated in the drawing is preferred, in which a lower axle tab 7c, which bears against the longitudinal control arm 4 from below and serves here as a spring plate 7c, is an integral part of the fork 8 itself.

In the region of the branching of the fork 8, additional fork ends 10a, 10b are fastened to the two fork halves 9a, 9b. Each of the two fork ends 10a, 10b is a plate which extends upward and therefore essentially at right angles with respect to the orientation of the fork 8. The fork ends 10a, 10b are connected to the respective fork halves 9a, 9b of the fork 8 via screw connections 11. In the vicinity of their upper edge, the fork ends 10a, 10b are provided with respective holes for accommodating the axis of rotation of a joint 12. The holes of both fork ends 10a, 10b are aligned here with respect to each other.

Figure 2:
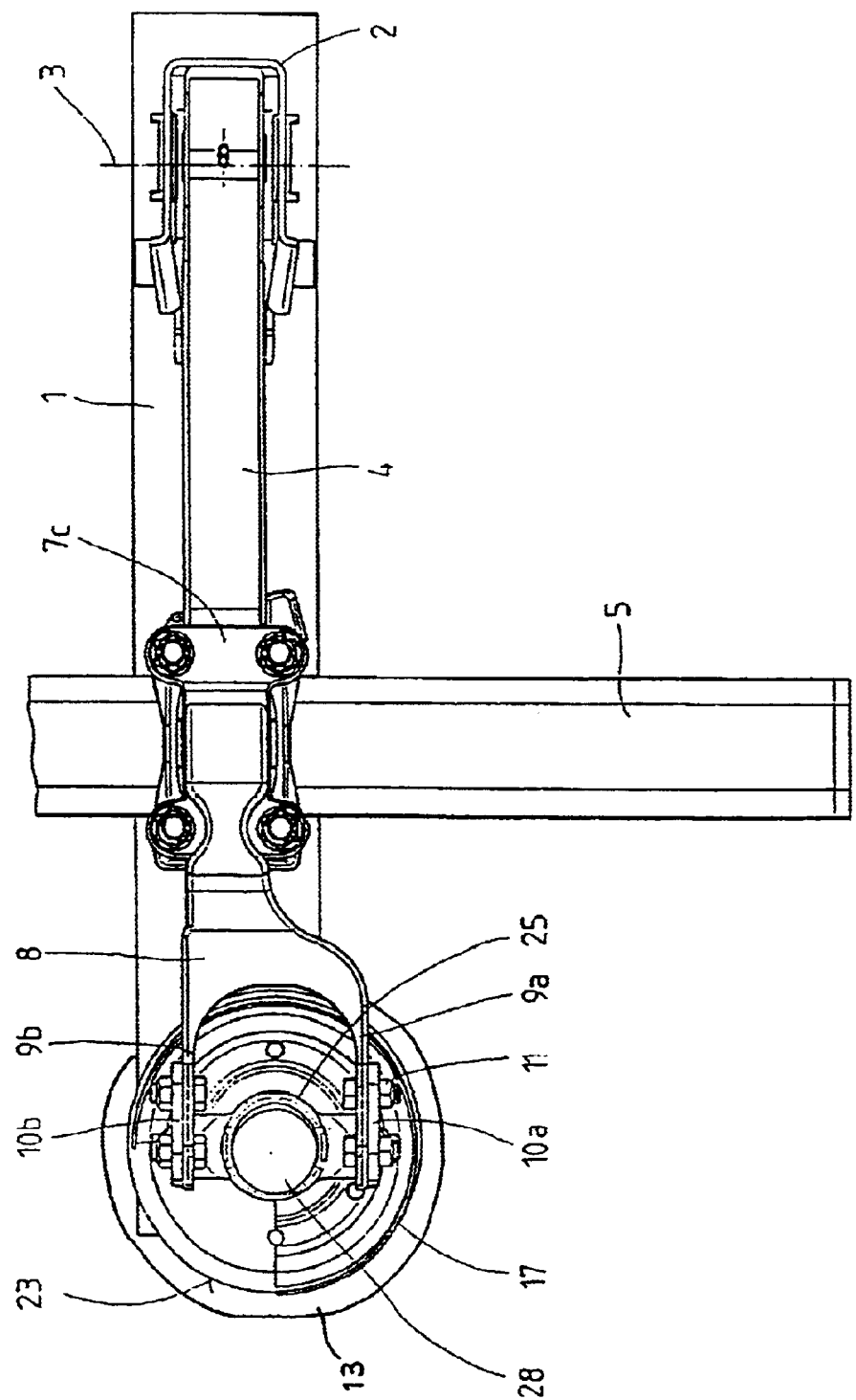
FIG. 2 is a plan view of the chassis from below.
Figure 3:
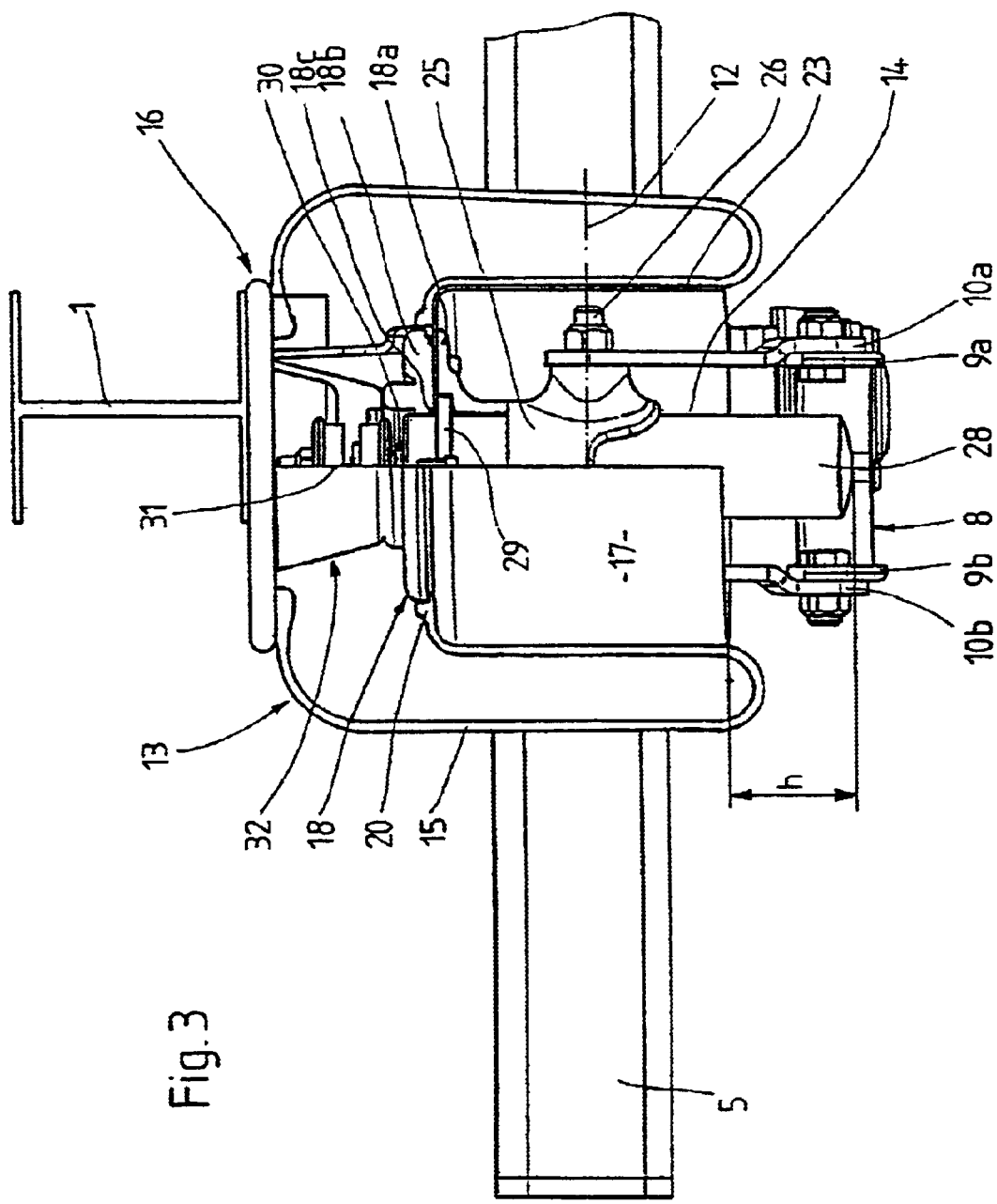
FIG. 3 is a section view through the chassis according to the section plane III—III shown in FIG. 1, with parts of the air spring being illustrated in a half view.

Furthermore, part of the axle structure illustrated in FIGS. 1 to 3 is an air spring 13 having a vibration absorber 14 integrated structurally in it. The air spring 13 and vibration absorber 14 are both supported, on the longitudinal control arm side, on the joint 12 on the fork ends 10a, 10 b, and, on the vehicle side, from below against the vehicle frame 1.

The air spring 13 comprises essentially a flexible U-type bellows 15, a cover 16 fixing the upper end of the U-type bellows 15 on the vehicle frame 1, a trunk piston 17, for example made of plastic, and a flange-shaped supporting element 18, to which the U-type bellows 15 is fastened at its lower end. The trunk piston 17 serves in a manner known per se to provide a preferably cylindrical circumferential surface 23 on which the lower part of the U-type bellows 15 can roll in a controlled manner. FIG. 1 shows the air spring 13 in the evacuated state, i.e. the air pressure in the interior of the U-type bellows 15 is very low or virtually zero. In this state, the air spring 13 is not in operation; rather, a thrust ring 19 of the flange-shaped supporting element 18 is supported from below against part of the cover 16 and the air spring "sits on it". In this state, the U-type bellows 15 has rolled with a large part of its length over the circumferential surface 23 of the trunk piston.

The supporting element 18 has a threefold function. Firstly, the upwardly pointing thrust ring 19 which is made of rubber and on which the cover 16, and therefore the vehicle weight, is supported when the air spring has been evacuated, is formed on the supporting element, as already described. Secondly, the supporting element 18 serves for the pressure-tight fastening of the lower end of the U-type bellows 15. To this end, in the case of the exemplary embodiment which is illustrated, the supporting element 18 comprises a lower flange 18a and an upper flange 18b having the thrust ring 19. The two flanges 18a, 18b form, on their outer circumference, a groove in which the bead-shaped end 20 of the U-type bellows 15 is secured in a pressure-tight manner. Thirdly, the supporting element 18 serves for fastening the trunk piston 17. For this purpose, that base 22 of the trunk piston 17 which is situated at the top is clamped between the two flanges 18a, 18b. The preferably cylindrical circumferential surface 23 of the trunk piston extends from this base 22 downward toward the longitudinal control arm. Screw connections 24 connect the two flanges 18a, 18b to each other and at the same time penetrate the base 22 of the trunk piston.

The lower flange 18a is an integral part of a sleeve 25 which furthermore includes two joint bolts 26. The joint bolts 26, which are integrally formed lying opposite each other at 180° on the otherwise cylindrical sleeve 25, form the already mentioned axis of rotation of the joint 12. This axis of rotation of the joint 12 extends parallel to the axis of rotation of the articulation point 3 of the longitudinal control arm.

Figure 4:
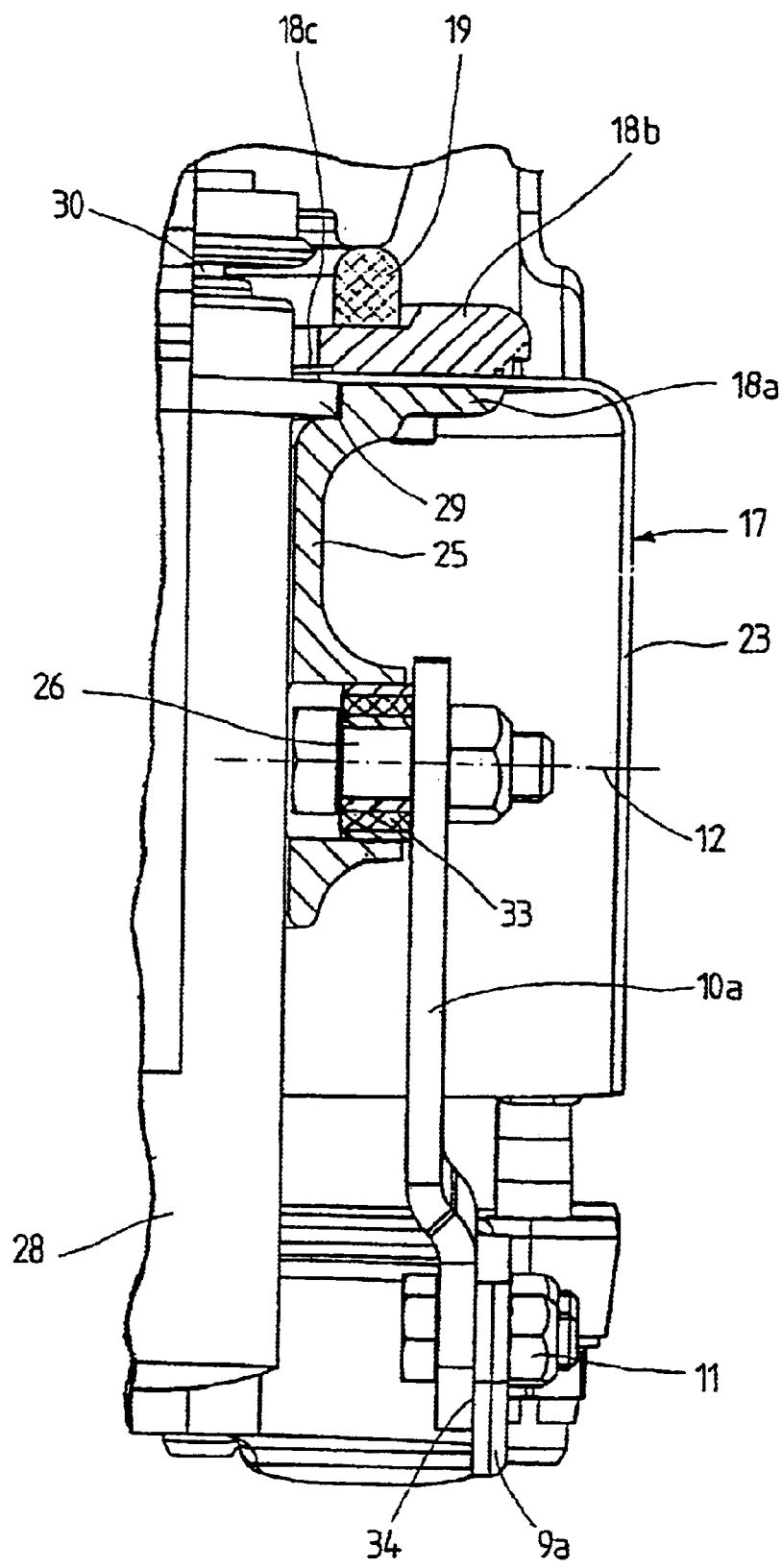
FIG. 4 shows an enlarged illustration similar to FIG. 3, but for a different embodiment.

Details in the design of the joint, including the joint bolts 26 and their articulated connection on the protruding fork ends 10a, 10b, can best be seen in FIGS. 3 and 4. It can furthermore be seen from FIG. 3 and FIG. 4 that the joint 12 is situated approximately halfway along the circumferential surface 23 of the trunk piston 17.

The piston cylinder 28 of the vibration absorber 14 is situated within the essentially cylindrical sleeve 25. However, the cylindrical housing of the piston cylinder 28 is stretched to a sufficient length that the piston cylinder 28 not only protrudes with part of its length downward from the sleeve 25, but also downward from the trunk piston 17 concentrically surrounding it. That height h by which the piston cylinder 28 protrudes downward from the trunk piston 17 is shown in FIG. 3. This enables this lower part of the piston cylinder 28 to be exposed to a flow of cooling air during the journey and enables the damping oil contained in the piston cylinder to be cooled. The two fork ends 10a, 10b are not in the way of this air flow, since they are situated, as viewed in the direction of travel, exclusively to the side of the piston cylinder 28. This can be seen particularly clearly in FIG. 3.

The pressure-tight fastening of the piston cylinder 28 likewise takes place using the two-part supporting element 18. To this end, a collar 29, which is additionally fitted on the piston cylinder 18, is supported with its lower side on the lower flange 18a, and with its upper side on the upper flange 18b of the supporting element 18. This enables the piston cylinder 28 to be connected in a form-fitting manner and rigidly to the supporting element 18, and therefore also to the sleeve 25, without it being possible for compressed air to escape from the air spring in the region of this connection. The seal 18c, among other things, prevents this.

Figure 1A:
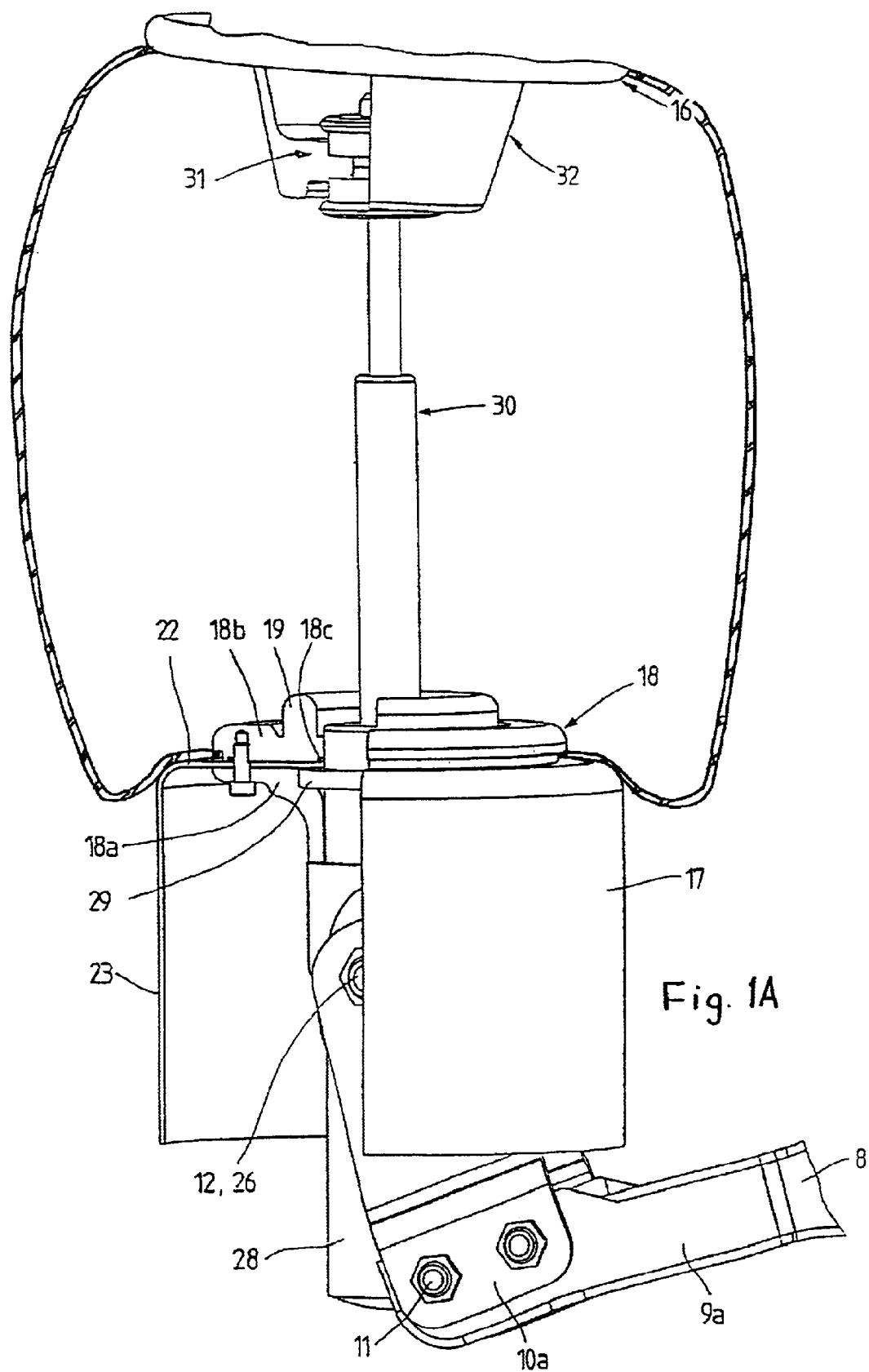
FIG. 1a shows a detail from FIG. 1, but with the vibration absorber extended.

The second main part of the vibration absorber 14 is the piston rod 30 which can be extended out of the piston cylinder 28, as shown in FIG. 1a. The piston rod is fastened by its upper end in an articulated manner to the cover 16 of the air spring 13, which is shown in a pressurized state. This articulation ability can be achieved, for example, by a rubber element which is elastic over certain angular degrees and via which the end of the piston rod 30 is supported on the cover 16. This elastic joint 31 has at the same time to take on a sealing function in order to avoid losses of air from the air spring at this point.

The joint 12 is also of elastic design in a certain manner as can be seen in the embodiment according to FIG. 4. An elastomeric element in the form of a rubber bushing 33 is situated between the mount on the sleeve 25 and the joint bolt 26. By means of this measure, the deformation, which occurs during the driving mode, of the chassis, which comprises the longitudinal control arm and the axle tube, can be compensated for without this deformation resulting in impermissibly high transverse forces on the vibration absorber 14.

It can furthermore be seen from FIG. 4 that the connecting surface 34 between the fork half 9a of the fork and the fork end 10a which is directed upward therefrom can also be situated differently than illustrated in FIG. 3. Whereas, in FIG. 3, the connecting region of the fork half 9a is situated on the inside and the connecting region of the fork end 10a is situated on the outside, the relationships in the embodiment according to FIG. 4 are the other way around. Selection of the connecting surface 34, and possibly also selection of the shape and offset of the fork ends 10a, 10b, therefore enables presetting or adaptation of the parts to be undertaken transversely with respect to the longitudinal direction of the vehicle before the screw connection 11 is finally inserted and tightened. In this manner, a universal fork 8 can be used, in which the later adaptation takes place via corresponding selection and installation of the additional fork ends 10a, 10b.

With regard to the connection of the piston rod to the upper cover of the air spring, it can be seen in FIGS. 1 and 3 that the cover 16, which is fastened in the region of its outer circumference directly to the vehicle frame 1, has a central part 32 which projects in a cup-like manner downward in the direction of the air spring. While the upper end of the U-type bellows 15 is fastened in a pressure-tight manner to that outer circumference of the cover 16 which is situated a long way upward, the end of the piston rod is fastened in an articulated and pressure-tight manner to the base of the central part 32, which projects in a cup-like manner. The cover 16 accordingly has two connecting planes differing in height, this permitting a particularly compact manner of constructing the spring and shock absorber unit in the vertical direction.

The piston rod 30 of the vibration absorber 14 is preferably of two-stage design in the manner of a telescopic piston rod. This enables very large pull-out paths to be bridged. With the piston rod pushed in, which case is illustrated in the drawing, the two stages of the telescopic piston rod are situated largely within the piston cylinder 28. Suitable valve arrangements make it possible that, when the vibration damper is extended, first of all only one part of the two-part telescopic piston rod is extended and that, conversely, when the vibration absorber is pushed in, again likewise first of all only the one part is retracted. This can be achieved by a corresponding adaptation of the valves and damping-oil overflow cross sections in the vibration absorber.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A spring and shock absorber unit for air for installation between a vehicle frame and one of a vehicle axle and a longitudinal control arm guiding the vehicle axle, said unit comprising:

a support element;

an air spring comprising a U-type bellows having a lower end which is fixed in a pressure-tight manner to said support element and an upper end which can be fixed with respect to said frame, said air spring having a longitudinal axis;

a vibration absorber arranged on the longitudinal axis of the air spring and comprising a piston cylinder which is rigidly fixed with respect to said support element and a piston rod which is fixed with respect to said vehicle frame; and a joint for connecting said piston cylinder to one of said longitudinal control arm and said vehicle axle.

2. A spring and shock absorber unit as in claim 1 wherein said support element comprises a flange which surrounds said vibration absorber, said lower end of said U-type bellows being fixed in a pressure-tight manner to said flange, said unit further comprising a circumferential surface extending from said flange toward said one of a vehicle axle and a longitudinal control arm guiding the vehicle axle, said circumferential surface being arranged for said bellows to roll on said surface during compression and rebound.

3. A spring and shock absorber unit as in claim 2 wherein said circumferential surface surrounds said joint.

4. A spring and shock absorber unit as in claim 3 wherein said circumferential surface has an axial height extending from said flange, said joint being located at approximately half the height of the axial surface.

5. A spring and shock absorber unit as in claim 2 wherein said flange is fixed to said piston cylinder in a pressure tight manner.

6. A spring and shock absorber unit as in claim 1 wherein said piston cylinder comprises an end facing said piston rod and an end facing away from said piston rod, said piston cylinder having a collar on said end facing said piston rod, said collar being fixed to said support element.

7. A spring and shock absorber unit as in claim 6 wherein said end of said piston cylinder facing away from said piston rod extends beyond said air spring.

8. A spring and shock absorber unit as in claim 1 wherein said flange and said circumferential surface form a cup which is open toward said one of a vehicle axle and a longitudinal control arm guiding the vehicle axle.

9. A spring and shock absorber unit as in claim 1 wherein said joint has an axis of rotation which intersects said longitudinal axis at a right angle.

10. A spring and shock absorber unit as in claim 1 wherein said joint comprises an elastomeric element.

11. A spring and shock absorber unit as in claim 1 wherein said piston rod is a two-stage telescopic piston rod.

12. A spring and shock absorber unit for air for installation between a vehicle frame and one of a vehicle axle and a longitudinal control arm guiding the vehicle axle, said unit comprising:

a support element;

an air spring comprising a U-type bellows having a lower end which is fixed in a pressure-tight manner to said support element and an upper end which can be fixed with respect to said frame, said air spring having a longitudinal axis;

a vibration absorber arranged on the longitudinal axis of the air spring and comprising a piston cylinder which is rigidly fixed with respect to said support element and a piston rod which is fixed with respect to said vehicle frame;

a joint for connecting said piston cylinder to one of said longitudinal control arm and said vehicle axle; and a rigid sleeve surrounding said piston cylinder, said joint being situated on said sleeve, said piston cylinder and said support element being fixed to said sleeve.

13. A spring and shock absorber unit as in claim 12 wherein said piston cylinder comprises an end facing said piston rod and an end facing away from said piston rod, said piston cylinder having a collar on said end facing said piston rod, said collar being fixed to said support element.

14. A spring and shock absorber unit as in claim 13 wherein said end of said piston cylinder facing away from said piston rod extends beyond said air spring.

15. A spring and shock absorber unit as in claim 12 wherein said flange and said circumferential surface form a cup which is open toward said one of a vehicle axle and a longitudinal control arm guiding the vehicle axle.

16. A spring and shock absorber unit as in claim 12 wherein said joint has an axis of rotation which intersects said longitudinal axis at a right angle.

17. A spring and chock absorber unit as in claim 12 wherein said piston rod is a two-stage telescopic piston rod.

18. A spring and shock absorber unit as in claim 12 wherein said joint comprises an elastomeric element.

19. A spring and shock absorber unit for air for installation between a vehicle frame and one of a vehicle axle and a longitudinal control arm guiding the vehicle axle, said unit comprising:

a support element;

an air spring comprising a U-type bellows having a lower end which is fixed in a pressure-tight manner to said support element and an upper end which can be fixed with respect to said frame, said air spring having a longitudinal axis;

a vibration absorber arranged on the longitudinal axis of the air spring and comprising a piston cylinder which is rigidly fixed with respect to said support element and a piston rod which is fixed with respect to said vehicle frame;

a joint for connecting said piston cylinder to one of said longitudinal control arm and said vehicle axle; and a fork which is fixed to a longitudinal control arm, said fork having two arms, said piston cylinder being pivotably arranged between said arms and connected thereto by said joint.

20. A spring and shock absorber unit as in claim 19 wherein said piston cylinder comprises an end facing said piston rod and an end facing away from said piston rod, said piston cylinder having a collar on said end facing said piston rod, said collar being fixed to said support element.

21. A spring and shock absorber unit as in claim 20 wherein said end of said piston cylinder facing away from said piston rod extends beyond said air spring.

22. A spring and shock absorber unit as in claim 19 wherein said flange and said circumferential surface form a cur which is open toward said one of a vehicle axle and a longitudinal control arm guiding the vehicle axle.

23. A spring and shock absorber unit as in claim 19 wherein said joint has an axis of rotation which intersects said longitudinal axis at a right angle.

24. A spring and shock absorber unit as in claim 19 wherein said fork comprises a base which forms an extension of said longitudinal control arm, said arms extending at right angles to said base.

25. A spring and shock absorber unit as in claim 19 wherein said piston rod is a two-stage telescopic piston rod.

26. A spring and shock absorber unit as in claim 19 wherein said joint comprises an elastomeric element.

27. A spring and shock absorber unit for air for installation between a vehicle frame and one of a vehicle axle and a longitudinal control arm guiding the vehicle axle, said unit comprising:

a support element;

an air spring comprising a U-type bellows having a lower end which is fixed in a pressure-tight manner to said support element and an upper end which can be fixed with respect to said frame, said air spring having a longitudinal axis;

a vibration absorber arranged on the longitudinal axis of the air spring and comprising a piston cylinder which is rigidly fixed with respect to said support element and a piston rod which is fixed with respect to said vehicle frame;

a joint for connecting said piston cylinder to one of said longitudinal control arm and said vehicle axle; and a cover which can be fixed to said vehicle frame, said upper end of said U-type bellows being fixed in a pressure-tight manner to said cover, said cover having a central part which projects in a cup-like manner inside said air spring to a base, said piston rod being supported in a pressure-tight manner on said base.

28. A spring and shock absorber unit as in claim 27 wherein said piston cylinder comprises an end facing said piston rod and an end facing away from said piston rod, said piston cylinder having a collar on said end facing said piston rod, said collar being fixed to said support element.

29. A spring and shock absorber unit as in claim 28 wherein said end of said piston cylinder facing away from said piston rod extends beyond said air spring.

30. A spring and shock absorber unit as in claim 27 wherein said flange and said circumferential surface form a cup which is open toward said one of a vehicle axle and a longitudinal control arm guiding the vehicle axle.

31. A spring and shock absorber unit as in claim 27 wherein said joint has an axis of rotation which intersects said longitudinal axis at a right angle.

32. A spring and shock absorber unit as in claim 27 wherein said piston rod is a two-stage telescopic piston rod.

33. A spring and shock absorber unit as in claim 27 wherein said joint comprises an elastomeric element.

\* \* \* \* \*